(12) United States Patent
Hairston (10) Patent No.: US 9,162,566 B2
(45) Date of Patent: Oct. 20, 2015

(54) PTO WITH INTEGRATED RETARDER

(75) Inventor: Berron Hairston, Greenville, SC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 397 days.

(21) Appl. No.: 13/556,599

(22) Filed: Jul. 24, 2012

(65) Prior Publication Data

US 2014/0026690 A1    Jan. 30, 2014

(51) Int. Cl.
| | |
|---|---|
| F16H 37/00 | (2006.01) |
| B60K 17/28 | (2006.01) |
| B60T 10/00 | (2006.01) |
| B60T 13/58 | (2006.01) |
| F16D 57/00 | (2006.01) |
| F16D 63/00 | (2006.01) |
| F16H 57/00 | (2012.01) |

(52) U.S. Cl.
CPC .............. B60K 17/28 (2013.01); B60T 10/00 (2013.01); B60T 13/586 (2013.01); F16D 57/00 (2013.01); F16D 63/002 (2013.01); F16H 57/0006 (2013.01)

(58) Field of Classification Search
USPC ......... 180/53.6, 53.61, 53.62, 53.7; 74/15.84, 74/11, 409
See application file for complete search history.

(56) References Cited

U.S. PATENT DOCUMENTS

| | | | |
|---|---|---|---|
| 6,267,705 B1 | 7/2001 | Rose et al. | |
| 6,543,588 B1 * | 4/2003 | Raad | 188/267 |
| 2008/0315559 A1 * | 12/2008 | Murakami et al. | 280/446.1 |
| 2009/0211254 A1 | 8/2009 | Bartosch et al. | |
| 2010/0057281 A1 * | 3/2010 | Lawyer et al. | 701/22 |
| 2013/0166163 A1 * | 6/2013 | Oouchida et al. | 701/54 |
| 2013/0332035 A1 * | 12/2013 | Shioiri et al. | 701/50 |

OTHER PUBLICATIONS

U.S. Appl. No. 13/471,884, filed May 15, 2012 (21 pages).

* cited by examiner

*Primary Examiner* — Toan To
(74) *Attorney, Agent, or Firm* — Brinks Gilson & Lione (57) ABSTRACT

A power take-off unit ("PTO") may include a retarder to reduce noise while the transmission PTO output gear is operating at low torque. The retarder may variably load the PTO based on the PTO output load, while disengaging from the PTO while the PTO is not operational. The retarder may also serve as a primary retarder function to slow a vehicle's speed. The retarder may be controlled by a vehicle operator or by a processor.

20 Claims, 7 Drawing Sheets

PTO WITH INTEGRATED RETARDER

BACKGROUND OF THE INVENTION

1. Field of the Invention

The invention relates to power-take off units ("PTOs"). In particular, the invention relates to PTOs with an integrated retarder.

2. Related Art

PTOs provide a convenient means to power accessories or secondary functions of a vehicle or other powered equipment. PTOs may be used with vehicles of all types, including, but not limited to, automobiles, trucks, marine vessels, or airplanes. A PTO may also be used with an industrial engine. A PTO may interface directly with an engine, or may interface with a transmission that is used with an engine. Generally, the output of a PTO is a shaft to which other devices or equipment can be attached and powered. For example, the output of a PTO may be used to power a hydraulic pump, winch, or dump truck bed lift. PTOs may be driven by any torque carrying shaft in the engine, transmission, or vehicle.

A common arrangement is an engine driven PTO arrangement where the PTO receives an input torque from the engine crankshaft, or a component connected to the engine crankshaft. A common connection point for engine driven PTO applications is the torque converter impeller, which may be directly connected to the engine crankshaft through a connection to the engine flex-plate.

Typically, in engine-driven PTO applications, excessive gear noises are generated at the interface between the drive gear, which may be a gear in a transmission, and the PTO input gear due to backlash. Backlash may be described as the amount of clearance or space between mating components such as gears. Components may generate noise due to their backlash, particularly when the components are unloaded. Noise typically occurs when the engine is operating at low revolutions per minute ("RPM") due to torsional vibrations from the engine that excites the gear mesh of the drive gear and PTO input gear. Noise may also occur during PTO operation when the PTO is operating with a low torque load at the output side of PTO. This noise results in decreased efficiency and may be irritable or harmful to the operator of the vehicle or equipment that is driven by the PTO. Thus, there is a need for a PTO that offers reduced noise during operation, particularly when the PTO is operating with a low load or at low RPMs.

SUMMARY OF THE INVENTION

The descriptions below include apparatuses and methods for reducing the operation noise of PTOs. A PTO may include a retarder at a point along the torque path from the PTO input to the PTO output. The retarder increases the load on the PTO and correspondingly may decrease the noise caused by the backlash of the gears or other mated components along the torque path.

According to one embodiment of the invention, a power take-off unit comprises an input shaft an input gear connected the input shaft; an output shaft; a clutch operable to selectively transmit torque from the input shaft to the output shaft; and a retarder coupled with the input shaft, wherein the retarder is configured to selectively load the input shaft.

According to one embodiment of the invention, a power take-off unit comprises an input shaft an input gear connected to the input shaft; an output shaft selectively engaged to the input shaft; and a retarder configured to provide a variable load on the input shaft.

According to one embodiment of the invention, a method of operating a power take-off unit comprises the steps of receiving torque at a power take-off unit input; and increasing the load on a shaft of the power take-off unit by selectively controlling a retarder.

Other systems, methods, features and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

The described embodiments may alleviate the excessive noise generated when operating a PTO, particularly at low loads or at low RPMs. A PTO that integrates or interfaces with a vehicle transmission may include a retarder to reduce noise in the PTO due to backlash. The disclosed embodiments may be used in engine-, turbine-, or rear-driven PTOs.

Figure 1:
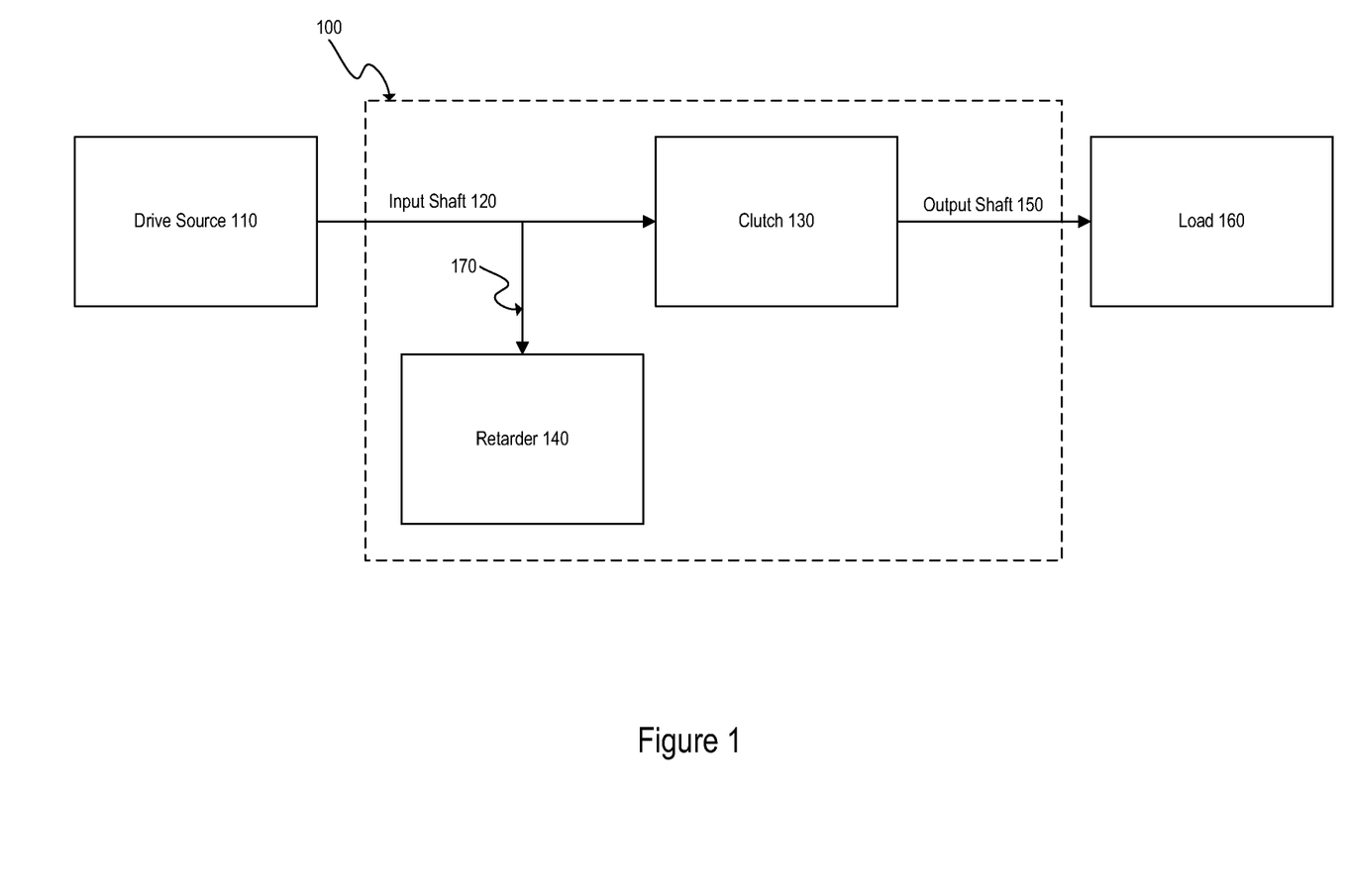
FIG. 1 is a block diagram of a drive source and a PTO that includes a retarder according to one embodiment of the invention.

FIG. 1 illustrates a block diagram of PTO 100 coupled with drive source 110 according to one embodiment of the invention. PTO 100 may be coupled to drive source 110, for example, by mechanical, electrical, hydraulic, or pneumatic means. PTO 100 includes input shaft 120 and output shaft 150. Drive source 110 supplies torque to input shaft 120. Drive source 110 may be an engine, e.g., an internal combustion or diesel engine. Alternatively, drive source 110 may additionally include a transmission or gear assembly that provides a mechanical interface to input shaft 120.

Torque generated by drive source 110 flows along input shaft 120 to clutch 130. Clutch 130 may be any type of clutch including a dog clutch, dry clutch, wet clutch, single-plate clutch or multi-plate clutch. Retarder 140 is coupled to input shaft 120 by coupling 170, which may be, for example, two meshed gears or a clutch. Retarder 140 may be a mechanical, electrical, or hydraulic retarder. If retarder 140 is an electrical retarder, retarder 140 may convert the kinetic energy of the torque transmitted to retarder 140 by input shaft 120 into electricity, which may be fed into an electrical system (not shown). Retarder 140 is configured to place a torque load on input shaft 120 that may correspondingly reduce the noise generated in PTO 100. This noise may originate at the interface between input shaft 120 and drive source 110, or at clutch 130. Retarder 140 may also advantageously serve as the primary retarder function of the transmission. Some transmissions, particularly those used in heavy duty trucks, include a retarder function that reduces the output of the transmission to slow the speed of a vehicle to reduce the wear and reliance on the vehicle's brakes. Retarder 140 may provide this function because it may be configured to place a torque load on a transmission output.

The retarder 140 can be activated with or without clutch 130 activated. Thus, retarder 140 may be activated when vehicle speed reduction is desired or when noise reduction is desired to counter the effects of gearing backlash between PTO 100 drive source 110. Retarder 140 may be activated using coupling 170, for example, when coupling 170 is a clutch. Retarder 140 may alternatively be activated by a mechanism (not shown) internal to retarder 140.

Output shaft 150 is coupled to load 160. Output shaft 150 may be coupled, for example, mechanically to load 160 using a splined shaft configuration. Load 160 may be any accessory or equipment such as a hydraulic pump or air compressor. Load 160 may be variable, and may range from zero torque load to a maximum torque load, e.g., 150 ft.-lbs., as determined by the manufacturer of the PTO.

When load 160 is low, for example, approximately 0 ft.-lbs., and PTO 100 is operating, noise generated by the various components of PTO 100 may be reduced by engaging retarder 140 with input shaft 120 using coupling 170. Retarder 140 may provide a torque load on input shaft 120 that reduces noise due to backlash. Furthermore, noise due to increased backlash may exist when clutch 130 is not activated, and thus, not transmitting torque to output shaft 150. In this case, retarder 140 may be activated to increase the torque load on input shaft 120, thereby reducing noise due to the backlash.

When load 160 is substantially above zero, for example, when load 160 is 5 ft.-lbs., retarder 140 may be disengaged because there may be less backlash noise due to the increased load 160. In a disengaged state, retarder 140 may provide substantially zero load on input shaft 120. Even in the disengaged state, however, retarder 140 may cause some insubstantial drag on PTO 100 due to parasitic losses between retarder 140 and coupling 170, or other components of PTO 100. Parasitic losses may also be caused by a value or other mechanism that may be used to engage and disengage retarder 140. The parasitic losses may result in some non-zero, but insubstantial torque load on PTO 100, for example, in the range of 1 ft.-lb. to 4 ft.-lbs.

Figure 2:
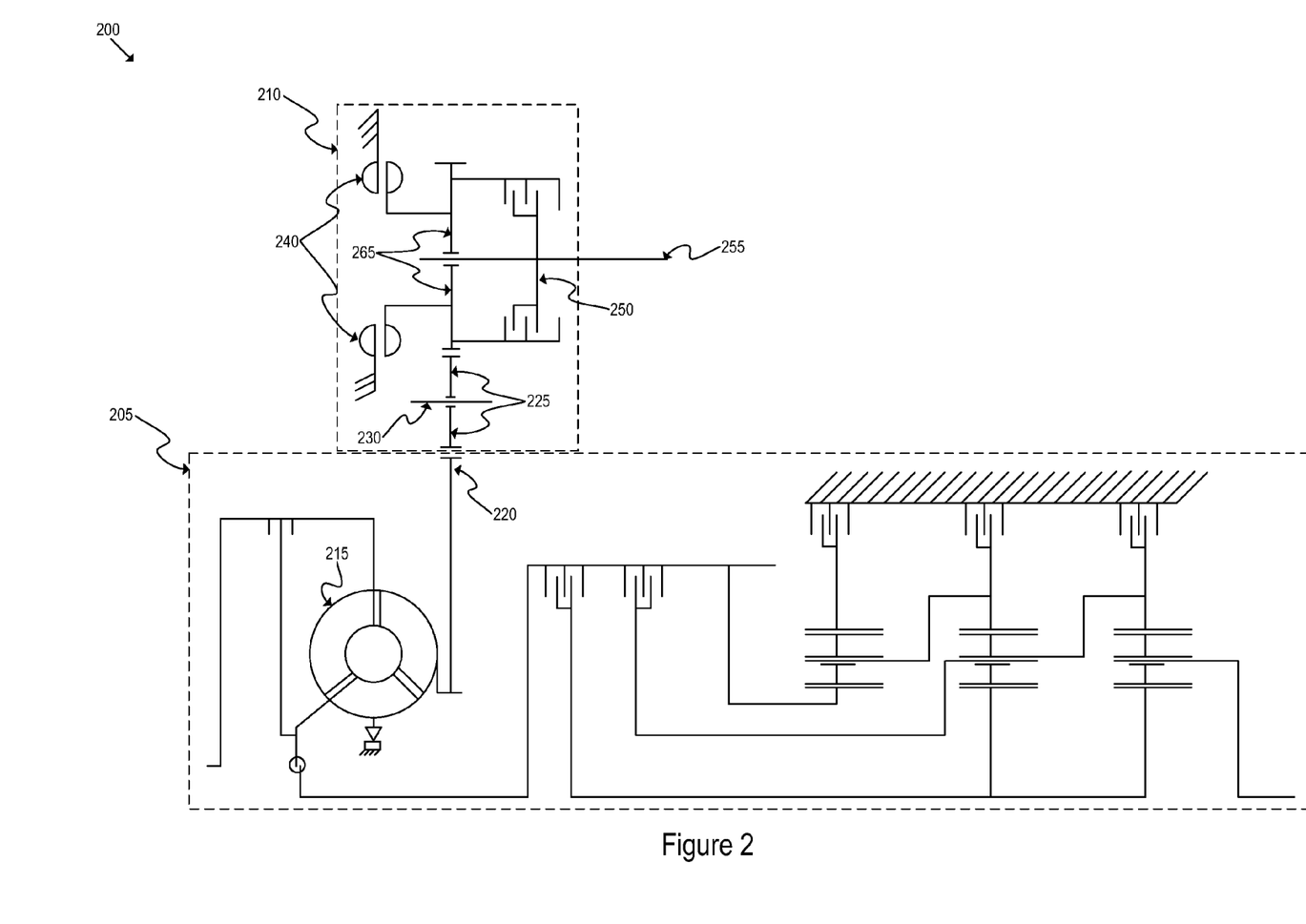
FIG. 2 is a schematic diagram of a transmission and a PTO that includes a retarder according to another embodiment of the invention.

FIG. 2 illustrates a schematic diagram of system 200 according to one embodiment of the invention. System 200 includes transmission 205 and PTO 210. Transmission 205 includes torque converter 215, and may be an automatic transmission. Alternatively, transmission 205 may be a manual transmission. Transmission 205 further includes drive gear 220 that may serve as a torque output to PTO 210. Drive gear 220 transmits torque to input gear 225. Typically, the interface of drive gear 220 and input gear 225 is a gear mesh. Input gear 225 transmits torque to idler shaft 230. Idler shaft 230 may advantageously transmit torque from one end of a vehicle to another, or may reverse the direction in which output shaft 255 rotates. Idler shaft 230 transmits torque to clutch pack 250 via gear 265, which may be directly fixed to the input side of clutch pack 250. If clutch pack 250 is not engaged, then torque is not transmitted to output shaft 255.

Retarder 240 is coupled to gear 265. Alternatively, retarder 240 may be coupled to input gear 225 or to any other torque-transmitting element in PTO 210. Retarder 240 may be engaged hydraulically, either by the hydraulic control of transmission 205, or by hydraulic controls internal to PTO 210. Alternatively, retarder 240 may be engaged mechanically, pneumatically, or electrically. Upon engagement of retarder 240, drag on PTO 210 may be increased such that the torque required to rotate gear 265 is increased. The increased torque requirement may eliminate or reduce backlash and the excessive noise created by the components of PTO 210. Retarder 240 may be disengaged while PTO 210 is not in use to avoid drag and decrease inefficiencies that may be caused by engaging retarder 240.

PTO 210 may also offer the advantage of providing a primary retarder to transmission 205. For example, if PTO 210 is bolted to transmission 205, PTO 210 may provide a primary retarding function to assist in controlling vehicle speed and reducing the use of the vehicle's service brakes. PTO 210 may have a mechanical bolt-on interface that provides a mechanical connection between the PTO and a transmission. The primary retarding function may be controlled by the driver of the vehicle through an in-cab switch or other user interface. Alternatively, the primary retarding function may be controlled by a processor. For example, a processor may detect when the vehicle's brakes are applied by receiving a brake signal from a sensor or other components located in the vehicle. The processor may then engage retarder 240 to assist the brakes in decreasing the vehicle's speed.

Figure 3:
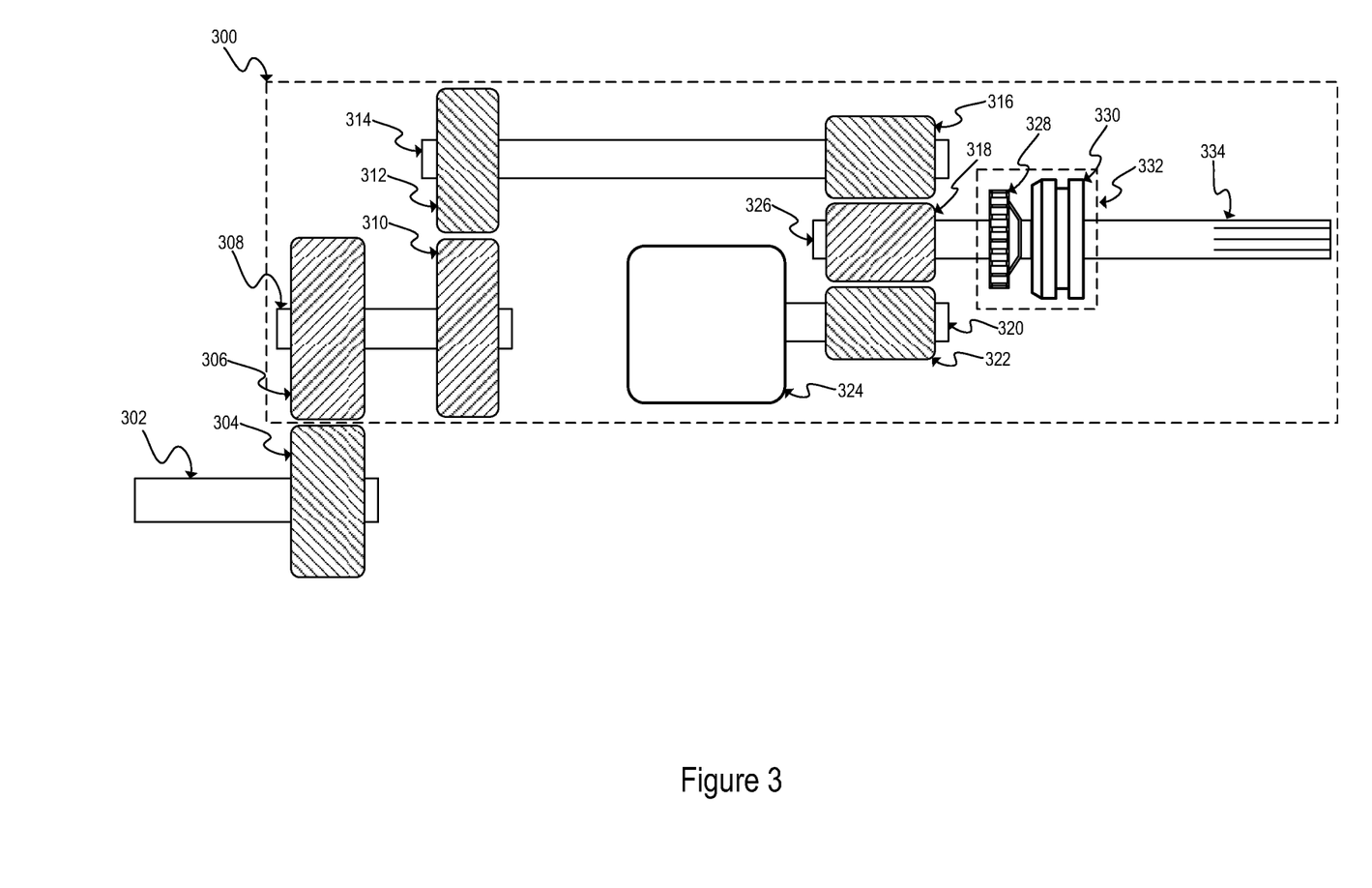
FIG. 3 is a mechanical illustration of a PTO equipped with a retarder according to another embodiment of the invention.

FIG. 3 depicts a mechanical illustration of PTO 300 according to another embodiment of the invention. Shaft 302 may be the output shaft of a drive source or a shaft in a transmission that is directly or indirectly coupled to a drive source. Shaft 302 is connected to gear 304. Input gear 306 of PTO 300 meshes with gear 304. Input gear 306 is connected to input shaft 308, which is also connected to gear 310. Idler gear 312 meshes with gear 310. Idler gear 312 is connected with idler gear shaft 314, which is also connected with gear 316. Gear 318 meshes with gears 316 and 322. Gear 322 is connected to shaft 320, which is connected to retarder 324. Retarder 324 may be a mechanical, electrical, or hydraulic retarder.

Gear 318 is connected to shaft 326, which is connected to first side 328 of clutch 332. Second side 330 selectively engages with first side 328 of clutch 332 to affect a torque transfer from shaft 326 to output shaft 334. When first side 328 is not engaged with second side 330, no torque is transferred from shaft 326 to output shaft 334. The operator of PTO 300 may control the configuration of clutch 332 to selectively transmit torque to output shaft 334 when operating PTO 300. Clutch 332 may be controlled electrically, mechanically, hydraulically, or pneumatically. PTO 300 may receive an input signal from a switch or user interface to provide the user of PTO 300 with a means of changing the configuration of clutch 332.

Output shaft 324 may optionally include splines as depicted in FIG. 3 for interfacing with a PTO load (not shown). A splined output shaft may be used where the PTO load includes a hollow shaft with groves that may mesh with and engage the splines on output shaft 334.

Figure 4:
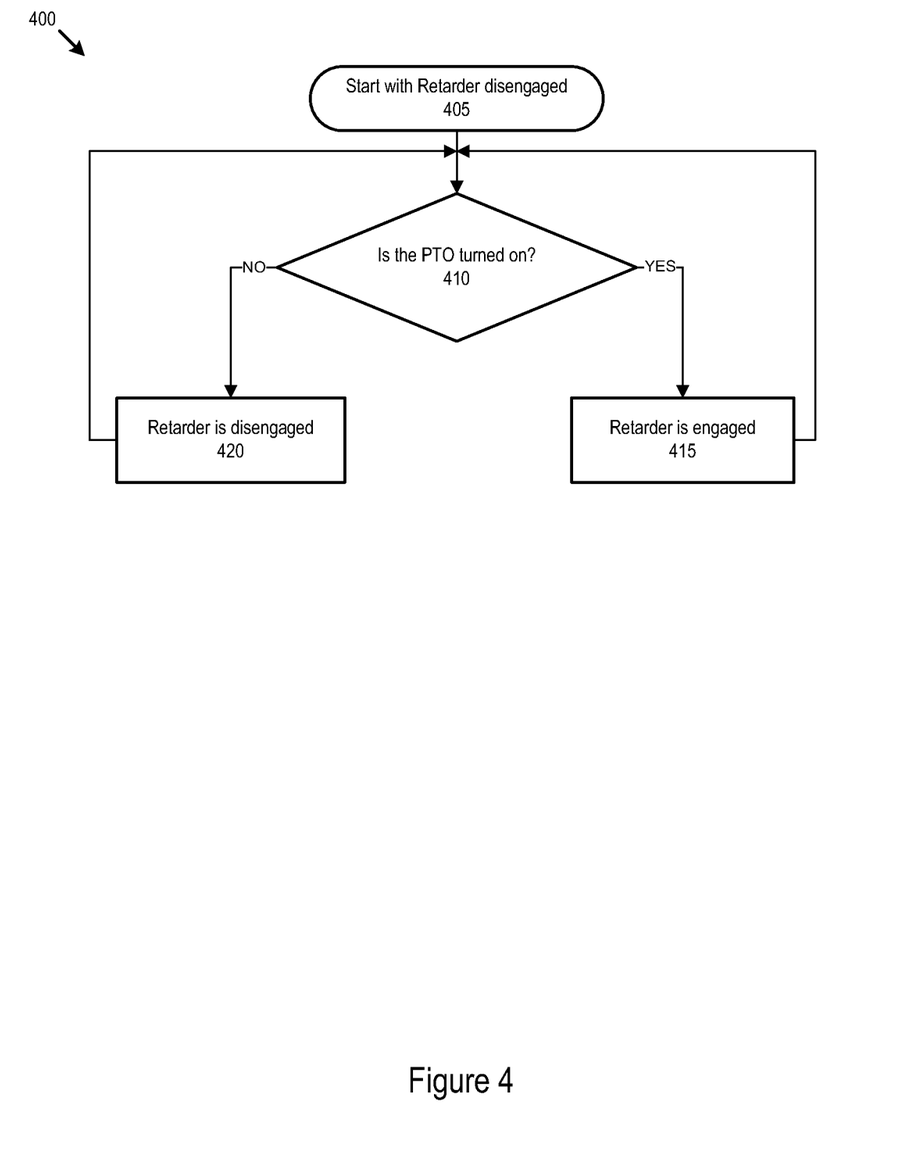
FIG. 4 is a flow diagram of a method for operating a PTO equipped with a retarder according to another embodiment of the invention.

FIG. 4 illustrates method 400 for loading a PTO shaft regardless of the torque load at the output of the PTO according to one embodiment of the invention. The method begins with step 405 in which a retarder is in a disengaged state, i.e., it is configured so that it does not place a load on the PTO. Determination 410 is made to determine whether the PTO is turned on. If the PTO is turned on, then the retarder is engaged in step 415. If the PTO is not turned on, then the retarder is disengaged in step 420. The retarder will remain in a steady state—either engaged or disengaged—until the operator switches the PTO from off to on, or vice versa. Alternatively, method 400 may start with the retarder in an engaged state.

Figure 5:
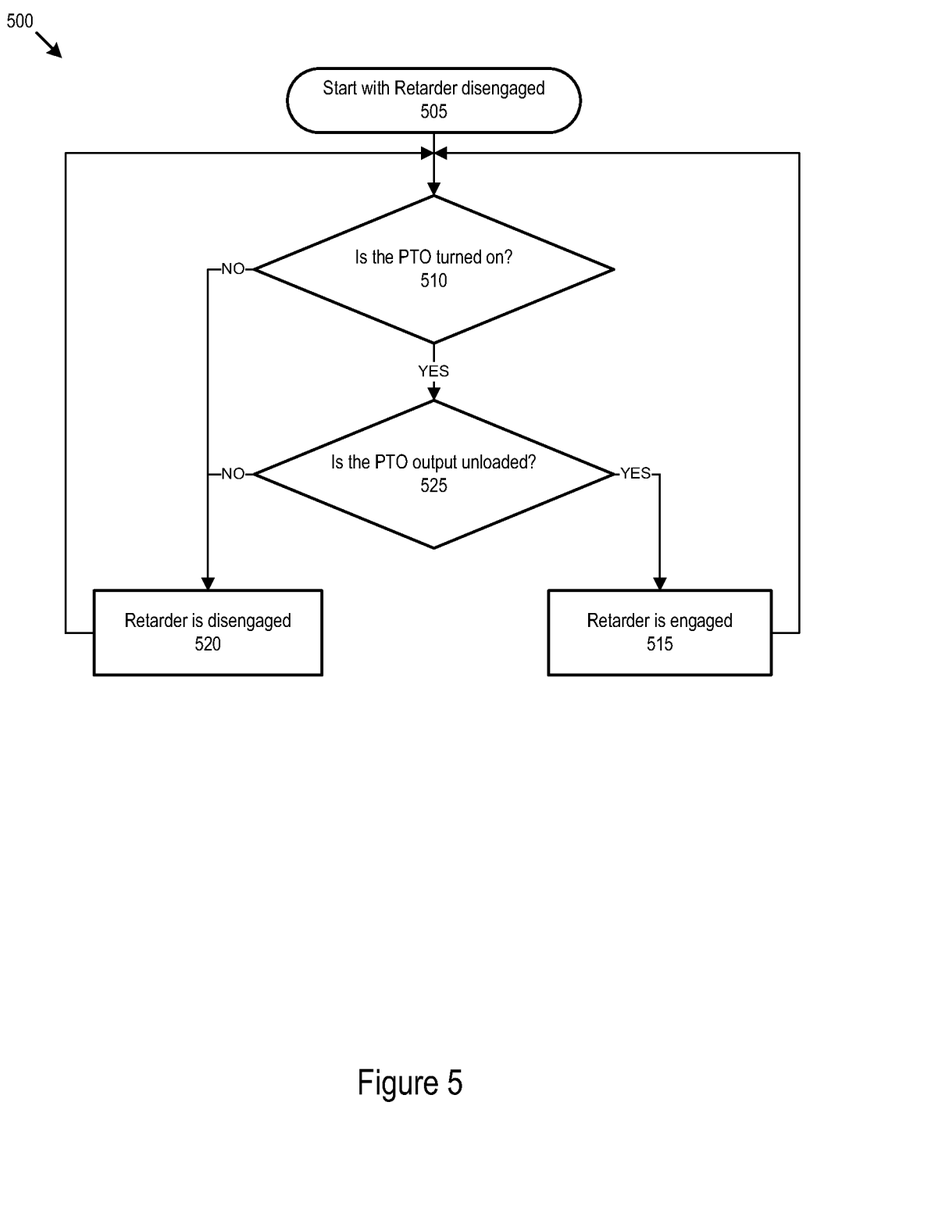
FIG. 5 is a flow diagram of a method for operating a PTO equipped with a retarder according to another embodiment of the invention.

FIG. 5 illustrates method 500 for loading a PTO shaft based on whether the PTO output is unloaded. The method begins with step 505 in which a retarder is in a disengaged state, i.e., it is configured so that it does not place a load on the PTO. Determination 510 is made to determine whether the PTO is turned on. If the PTO is not turned on, then the retarder remains disengaged in step 520. If the PTO is turned on, then determination 525 is made to determine whether an external load is present at the PTO output. The external load, such as load 160 in FIG. 1, is a load other than the load provided by the retarder. If the PTO output is unloaded, then the retarder is engaged in step 520. The retarder will remain in a steady state—either engaged or disengaged—based on whether the PTO is turned on or off, and/or whether the PTO is unloaded.

Determination 525 may be made by the operator based on a visual inspection of the PTO output. Alternatively, determination 525 may be made automatically by a sensor that is either integrated with the PTO or is separate from the PTO. For example, an optical sensor may detect whether the PTO is loaded, or a torque transducer, torque sensor, or torque meter may be used to measure the torque load at the PTO output.

Figure 6:
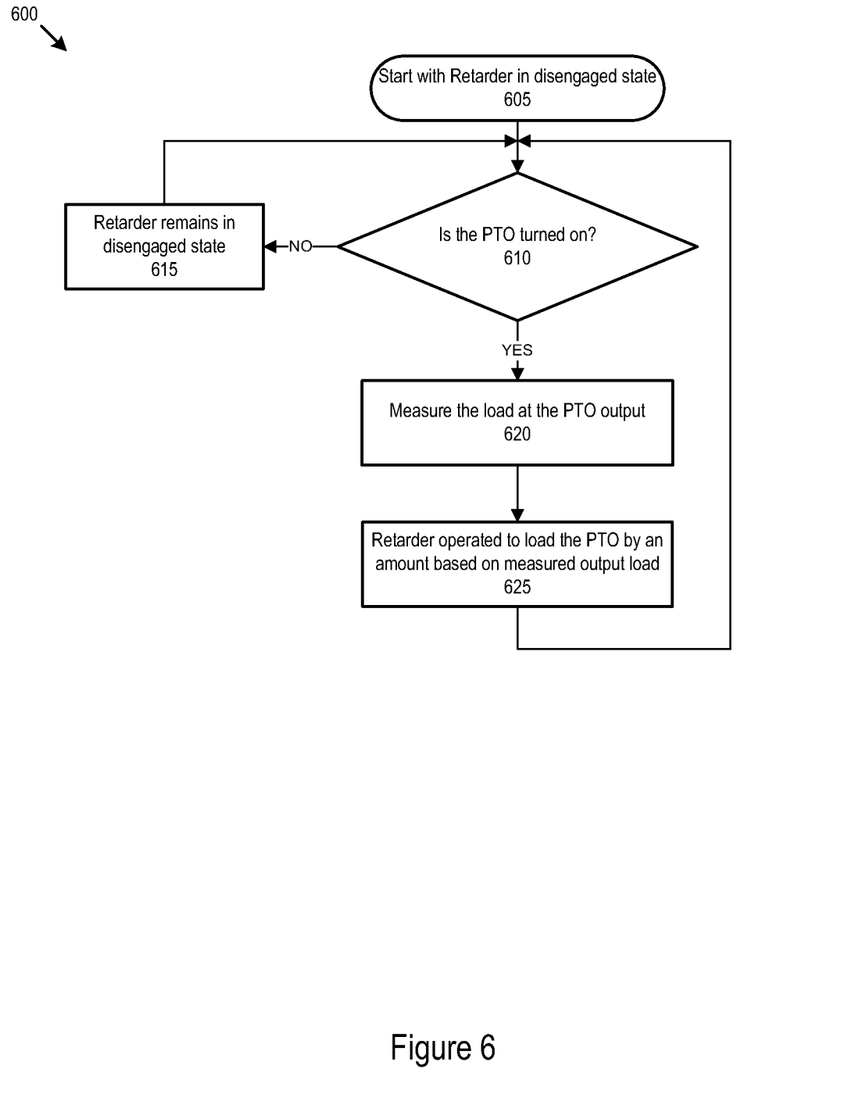
FIG. 6 is a flow diagram of a method for operating a PTO equipped with a retarder according to another embodiment of the invention.

FIG. 6 illustrates method 600 for loading a PTO shaft based on the load measured at the PTO output. The method begins with step 605 in which a retarder is in a disengaged state, i.e., it is configured so that it does not place a load on the PTO. Determination 610 is made to determine whether the PTO is turned on. If the PTO is not turned on, then the retarder remains disengaged in step 615. If the PTO is turned on, then measurement 620 is made to measure the external load present at the PTO output. In step 625, the retarder is engaged to load the PTO by an amount based on the load of the PTO measured in step 620. For example, the retarder load may be inversely proportional to the PTO's external load. The retarder load may increase linearly as the PTO's external load decreases linearly. Alternatively, the retarder load may by decreased to zero, i.e., disengaged, at a particular and/or predetermined external load threshold. The advantages of basing the retarder load on the measured external load are flexibility, accuracy, and efficiency in operating the PTO. The retarder may be advantageously configured or programmed to place a minimum amount of load on the PTO to reduce noise, while not inefficiently loading the PTO and drive source.

Figure 7:
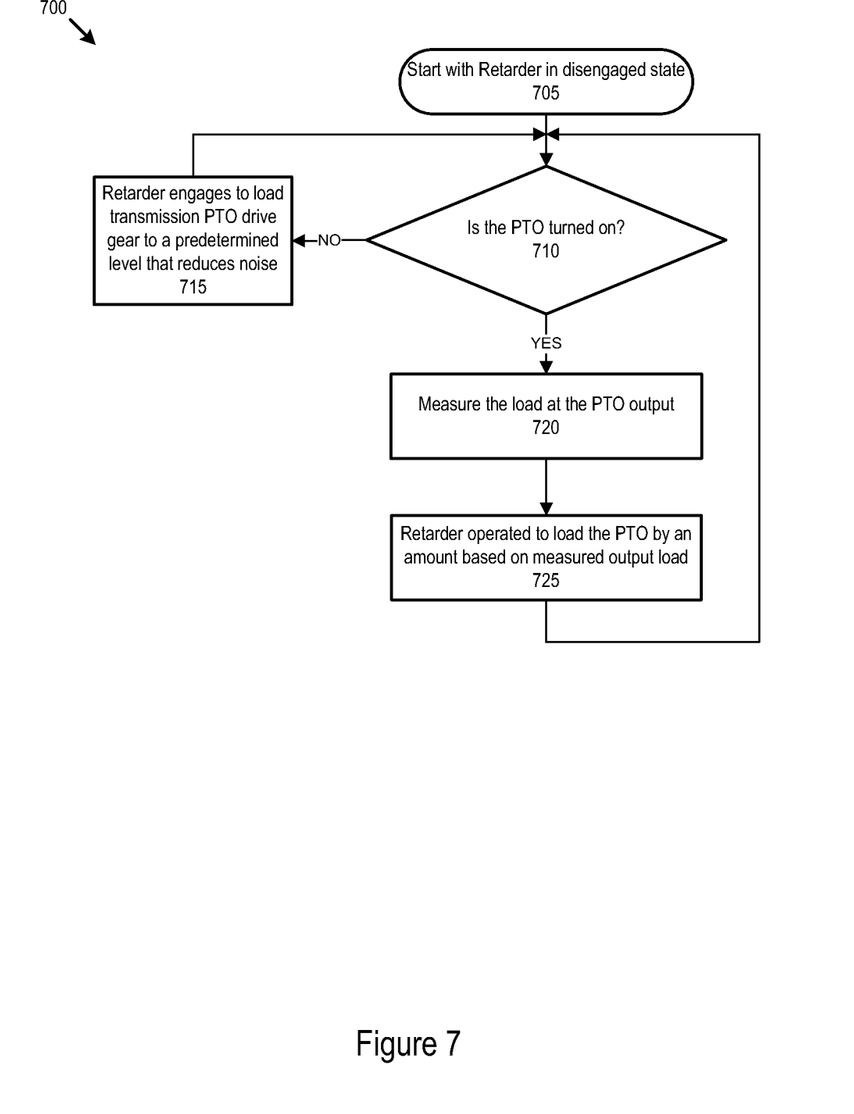
FIG. 7 is a flow diagram of a method for operating a PTO equipped with a retarder according to another embodiment of the invention.

FIG. 7 illustrates method 700 for loading a PTO shaft based on the load measured at the PTO output and the operational states of the PTO, e.g., whether the PTO is turned on or off. The method begins with step 705 in which a retarder is in a disengaged state, i.e., it is configured so that it does not place a load on the PTO. Determination 710 is made to determine whether the PTO is turned on. If the PTO is not turned on, then the retarder engages to provide a predetermined amount of load on the PTO to reduce noise in step 715. The predetermined amount may be based on a characterization of the PTO's operational noise or other sources of noise associated with the operation of the PTO, for example, at an interface between the PTO and a transmission. The predetermined amount may be the minimum amount of load necessary to maintain a noise level that is tolerable by humans. The predetermined amount may also be selectable or programmable by an operator.

If the PTO is turned on, then measurement 720 is made to measure the external load present at the PTO output. In step 725, the retarder is engaged to load the PTO by an amount based on the load of the PTO measured in step 720. For example, the retarder load may be inversely proportional to the PTO's external load. The retarder load may increase linearly as the PTO's external load decreases linearly. Alternatively, the retarder load may by decreased to zero, i.e., disengaged, at a particular and/or predetermined external load threshold.

The gears used in the disclosed embodiments may include spur gears, bevel gears, worm gears, hypoid gears, planetary gears, herringbone gears, and helical gears. The use of helical gears may be advantageous because of their high efficiency and low noise. Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A power take-off unit comprising:
   an input shaft;
   an input gear connected the input shaft;
   an output shaft;
   a clutch operable to selectively transmit torque from the input shaft to the output shaft; and
   a retarder coupled with the input shaft,
   wherein the retarder is configured to selectively load the input shaft.

2. The power take-off unit of claim 1 wherein the retarder is configured to variably load the input shaft based on a parameter.

3. The power take-off unit of claim 2 wherein the parameter is based on a load on the output shaft that is external to the power take-off unit.

4. The power take-off unit of claim 1 wherein the retarder is configured to disengage from the input shaft when the PTO is not in use.

5. The power take-off unit of claim 1 further comprising a mechanical bolt-on interface that provides a mechanical connection between the power take-off unit and a transmission.

6. The power take-off unit of claim 1 wherein the retarder is selected from a group consisting of
   a mechanical retarder;
   a hydraulic retarder; and
   an electric retarder.

7. The power take-off unit of claim 1 wherein the retarder is an electric retarder configured to electrically connect to a vehicle electrical system.

8. A power take-off unit comprising:
   an input shaft
   an input gear connected to the input shaft;
   an output shaft selectively engaged to the input shaft; and a retarder configured to provide a variable load on the input shaft.

9. The power take-off unit of claim 8 further comprising a clutch configured to selectively engage the output shaft with the input shaft.

10. The power take-off unit of claim 9 further comprising an idler gear shaft, wherein the idler shaft is configured to transmit torque from the input shaft to the output shaft.

11. The power take-off unit of claim 8 wherein the retarder is configured to provide substantially zero load when the power take-off unit is not in use.

12. The power take-off unit of claim 8 wherein the retarder is configured to provide substantially zero load when the power take-off unit is loaded with an external load substantially equal to a maximum load limit of the power take-off unit.

13. The power take-off unit of claim 8 wherein the retarder is configured to place a torque load on a transmission output to selectively slow the speed of a vehicle.

14. The power take-off unit of claim 8 further comprising a torque sensor configured to measure a torque output load of the power take-off unit, wherein the torque sensor is in communication with the retarder.

15. The power take-off unit of claim 14 wherein the variable load provided by the retarder is based on the torque output load.

16. The power take-off unit of claim 14 wherein the variable load provided by the retarder is inversely proportional to the torque output load.

17. A method of operating a power take-off unit comprising:
receiving torque at a power take-off unit input; and
increasing the load on a shaft of the power take-off unit by selectively controlling a retarder.

18. The method of operating a power take-off unit in claim 17 further comprising decreasing the load on the power take-off unit by disengaging the retarder when the power take-off unit is not in use.

19. The method of operating a power take-off unit in claim 17 further comprising decreasing the load on the power take-off unit by selectively controlling a retarder to place a predetermined load on the power take-off unit.

20. The method of operating a power take-off unit in claim 19 wherein the predetermined load is based on a reduction in noise of the power take-off unit.

* * * * *